US012105519B2

(12) United States Patent
Kim et al.

(10) Patent No.: US 12,105,519 B2
(45) Date of Patent: Oct. 1, 2024

(54) METHOD FOR ESTIMATING POSITIONING OF MOVING OBJECT BY USING BIG CELL GRID MAP, RECORDING MEDIUM IN WHICH PROGRAM FOR IMPLEMENTING SAME IS STORED, AND COMPUTER PROGRAM STORED IN MEDIUM IN ORDER TO IMPLEMENT SAME

(71) Applicant: TWINNY Co., Ltd., Daejeon (KR)

(72) Inventors: Tae Hyoung Kim, Daejeon (KR); Hong Seok Cheon, Daejeon (KR); Jai Hoon Lee, Daejeon (KR)

(73) Assignee: Twinny Co., Ltd., Daejeon (KR)

( * ) Notice: Subject to any disclaimer, the term of this patent is extended or adjusted under 35 U.S.C. 154(b) by 331 days.

(21) Appl. No.: 17/442,562

(22) PCT Filed: Mar. 10, 2020

(86) PCT No.: PCT/KR2020/003296
§ 371 (c)(1),
(2) Date: Sep. 23, 2021

(87) PCT Pub. No.: WO2020/197126
PCT Pub. Date: Oct. 1, 2020

(65) Prior Publication Data
US 2022/0187845 A1 Jun. 16, 2022

(30) Foreign Application Priority Data
Mar. 25, 2019 (KR) ........................ 10-2019-0033317

(51) Int. Cl.
*G05D 1/00* (2024.01)
(52) U.S. Cl.
CPC ....... *G05D 1/0274* (2013.01); *G06F 2218/08* (2023.01)

(58) Field of Classification Search
CPC .... G05D 1/0274; G05D 1/027; G05D 1/0272; G05D 1/0212; G05D 1/0238;
(Continued)

(56) References Cited

U.S. PATENT DOCUMENTS 8,195,331 B2 * 6/2012 Myeong ............... G05D 1/0274
134/18
8,515,613 B2 * 8/2013 Tanaka ................. G05D 1/0274
701/25
(Continued)

FOREIGN PATENT DOCUMENTS

JP 2005326944 11/2005
KR 10-2006-0078162 7/2006
(Continued)

OTHER PUBLICATIONS

Twinny Portfolio at p. 13 (The date is written on p. 1.).
Artificial Intelligent Industry Association Journal. vol. 13, Aug. 31, 2018 (p. 6).

*Primary Examiner* — Kenny Nguyen
(74) *Attorney, Agent, or Firm* — Blueshift IP; Robert Plotkin

(57) ABSTRACT

Embodiments are proposed, including: a method for estimating the posture of a moving object by using a big cell grid map; a recording medium in which a program for implementing the method is stored; and the computer program stored in the medium to implement the method. More particularly, there are provided the embodiments including: a method for estimating the posture of a moving object by using a big cell grid map, the method dividing a map into a plurality of finite cells, and estimating and correcting the posture of a moving robot in the map (the big cell grid map) where map feature point information about a map feature point corresponding to a position of a corresponding cell is matched for each cell; a recording medium where a program (Continued)

for implementing the method is stored, and the computer program stored in the medium to implement the method.

12 Claims, 6 Drawing Sheets

(58) Field of Classification Search
CPC .............. G05D 1/0268; G06F 2218/08; G06V 20/56; G01C 21/30
See application file for complete search history.

(56) References Cited

U.S. PATENT DOCUMENTS

| | | | |
|---|---|---|---|
| 9,192,869 B2* | 11/2015 | Moriya | ................... A63H 17/00 |
| 2006/0149465 A1* | 7/2006 | Park | ..................... G05D 1/0274 |
| | | | 701/416 |
| 2009/0149990 A1* | 6/2009 | Myeong | ............... G05D 1/0274 |
| | | | 701/25 |
| 2009/0326713 A1* | 12/2009 | Moriya | .................. B25J 9/1676 |
| | | | 701/25 |

FOREIGN PATENT DOCUMENTS

| | | |
|---|---|---|
| KR | 10-0791384 | 12/2007 |
| KR | 10-0877072 | 12/2008 |
| KR | 10-1079197 | 10/2011 |
| KR | 10-1372482 | 3/2014 |
| KR | 10-1503903 | 3/2015 |
| KR | 10-1503904 | 3/2015 |
| KR | 10-1709683 | 2/2017 |
| KR | 10-1715780 | 3/2017 |
| KR | 10-1840700 | 3/2018 |
| KR | 10-2018-0078736 | 7/2018 |
| KR | 10-1877488 | 7/2018 |
| WO | 2015193941 | 12/2015 |

* cited by examiner

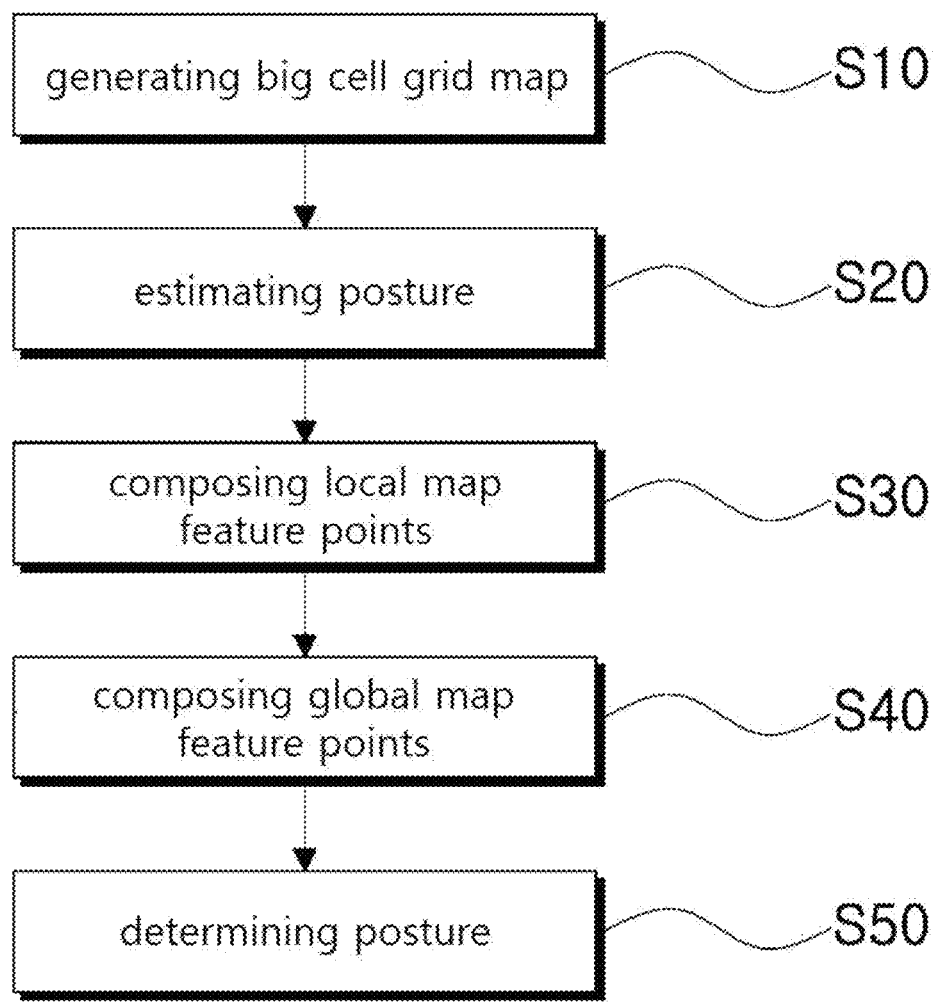

METHOD FOR ESTIMATING POSITIONING OF MOVING OBJECT BY USING BIG CELL GRID MAP, RECORDING MEDIUM IN WHICH PROGRAM FOR IMPLEMENTING SAME IS STORED, AND COMPUTER PROGRAM STORED IN MEDIUM IN ORDER TO IMPLEMENT SAME

CROSS-REFERENCE TO RELATED APPLICATIONS

This application is a national stage application of International Patent Application No. PCT/KR2020/003296 filed on Mar. 10, 2020, which claims priority to Korean Patent Application No. 10-2019-0014361 filed on Mar. 25, 2019, the entire contents of which are incorporated by reference herein.

The present disclosure relates to a method for estimating the posture of a moving object by using a big cell grid map, relates to a recording medium in which a program for implementing the method is stored, and relates to the computer program stored in the medium in order to implement the method. More particularly, the present disclosure relates to a method for estimating the posture of a moving object by using a big cell grid map, the method dividing a map into a plurality of finite cells, and estimating and correcting the posture of a moving robot in the map (i.e., the big cell grid map) in which map feature point information about map feature point corresponding to a position of a corresponding cell is matched for each cell, relates to a recording medium that stores a program for implementing the method, and relates to the computer program stored in the medium in order to implement the method.

BACKGROUND

The conventional technology for estimating a self-position by using the Global Positioning System (GPS) has a wide error range and difficulty in indoor use, so there is a problem that it is difficult to use for autonomous driving of indoor moving objects.

An Occupancy Grid Map (i.e., a grid map for short), which is a map based on cells divided into grids, and a feature map, which is a feature-point-based map, are two representative types of methodologies for an autonomous moving object to recognize an environment.

Among the maps, the grid map uses a method of recognizing the environment by dividing an area into small cells, and numerically displaying the extent to which each cell is occupied by an obstacle.

In the case of the grid map, there is no need to directly process sensor data, and each cell is randomly accessible on the basis of each position thereof. Therefore, when used for Simultaneous Localization and Mapping (SLAM) or self-position estimation, the grid map has an advantage that calculation may be performed in real time because a required quantity for the calculation may be limited to a predetermined level or less.

However, since the size of each cell should be kept small in order to express an environment in sufficient detail, there is a problem that a great amount of memory necessary to store information is required, and the amount of data required for the applied calculation is fundamentally large.

For this reason, an activity area of a moving object is sometimes limited due to the limit of memory.

In the case of the feature map, the feature map uses a method of processing recognized sensor data into an appropriate format, and then compressing and storing only necessary information, thereby recognizing an environment.

Since the feature map efficiently stores environment information, there is an advantage that a lot of memory is not required, the posture of a moving object may be accurately estimated with only a small amount of calculation, and various constraints of the moving object may be directly considered when planning a trajectory.

However, the feature map has a problem of being unable to access elements on the basis of position information when generating a map.

When generating the map or performing self-position estimation, such a problem makes performing of a real-time calculation impossible because the required amount of calculation increases in proportion to the size of the map. (i.e., as the size of a map increases, the number of required features (map feature points) increases, accordingly.) For this reason, there is a problem that the feature map is not widely used in the corresponding fields.

Korean Patent No. 10-1372482 discloses a method and device for planning a route of a moving object.

SUMMARY

Accordingly, the present disclosure is devised to solve the above-described problems and an objective of the present disclosure is to provide a method for estimating the posture of a moving object by dividing a map into a plurality of finite cells and using a big cell grid map configured to estimate and correct the posture of a moving robot in a map (i.e., big cell grid map) matched with map feature point information about a map feature point corresponding to a position of a corresponding cell for each cell, provide a recording medium in which a program for implementing the method is stored, and provide the computer program stored in the medium in order to implement the method.

The objective of an exemplary embodiment of the present disclosure is not limited to the above-mentioned objective, and other different objectives not mentioned herein will be clearly understood by those skilled in the art from the following description.

According to an exemplary embodiment of the present disclosure for achieving the objective as described above, a method for estimating the posture of a moving object by using a big cell grid map implemented in a form of a program executed by a calculation processing means including a computer includes: a step S10 of generating the big cell grid map, wherein the calculation processing means divides a map into a plurality of finite cells, and generates the big cell grid map in which map feature point information about a map feature point corresponding to a position of a corresponding cell is matched for each cell; a step S30 of composing local map feature points, wherein the calculation processing means extracts the map feature point information on the basis of sensing information detected by the moving object with an environment sensor; a step S40 of composing global map feature points, wherein the calculation processing means extracts the map feature point information belonging to the cells included in a detection area of the moving object on the basis of the sensing information of the step S30 of composing the local map feature points; and a step S50 of determining the posture, wherein the calculation processing means determines the position and the posture of the moving object on the basis of the map feature point information of the cells selected in the step S40 of composing the global map feature points and the sensing information detected in the step S30 of composing the local map feature points.

In addition, the map feature point information in the step S10 of generating the big cell grid map may be any one piece or a plurality of pieces of information selected from among information in which a shape of an object detected by the moving object with the environment sensor is expressed in a form of a geometric function and position information of a moving point and an identifier for position recognition that are arbitrarily registered in the map in advance.

In addition, the step S10 of generating the big cell grid map may include: a step S11 of dividing into the cells, wherein an entire map area is divided into a finite number of cells and unique identification information is provided to each cell; and a step S12 of storing the cells, wherein the map feature point information corresponding to the position of the corresponding cell is stored for each cell divided in the step S11 of dividing into the cells.

In addition, between the step S10 of generating the big cell grid map and the step S30 of composing the local map feature points, the method for estimating the posture of the moving object by using the big cell grid map may include: a step S20 of estimating the posture, wherein the calculation processing means estimates the position and the posture of the moving object on the basis of driving information of the moving object.

In addition, the posture of the step S20 of estimating the posture may include bow angle information.

In addition, the step S20 of estimating the posture may estimate the posture of the moving object on the basis of a movement distance measured through odometry (i.e., dead reckoning navigation).

In addition, the step S30 of composing the local map feature points may generate a local map feature point set L composed of extracted pieces of the map feature point information.

In addition, the step S40 of composing the global map feature points may compose a global map feature point set $M_r$ composed of the pieces of the map feature point information belonging to the respective cells included in the detection area of the moving object, and the step S50 of determining the posture may correct the posture of the moving object estimated in the step S20 of estimating the posture by comparing the local map feature point set L and the global map feature point set $M_r$.

In addition, according to the exemplary embodiment of the present disclosure, a computer-readable recording medium includes: a program configured to be stored therein and implement a method for estimating the posture of a moving object by using a big cell grid map.

In addition, according to the exemplary embodiment of the present disclosure, a program includes: a computer-readable recording medium configured to store the program and implement a method for estimating the posture of a moving object by using a big cell grid map.

According to an exemplary embodiment of the present disclosure that includes: the method for estimating the posture of the moving object by using the big cell grid map; the recording medium in which the program for implementing the method is stored; and the computer program stored in the medium to implement the method, wherein a map is divided into a plurality of finite cells and a big cell grid map in which map feature point information about a map feature point corresponding to a position of a corresponding cell is matched for each cell is used, so that in estimating a current position and posture of the moving object, arbitrary access to map feature information is allowed on the basis of position information, whereby there is an effect that the amount of calculation may be significantly reduced compared to a self-position estimation method based on the existing feature map.

In addition, even when the moving object does not recognize a current position thereof, that is, even in a state where the position of the moving object is initialized, the big cell grid map is used, and thus there is an effect that the moving object may estimate the current position thereof faster and more accurately than when using the grid map or the feature map.

In addition, there is an effect that the embodiment of the present disclosure may be applicable to various fields, including: technology for estimating and correcting posture of an indoor moving robot in a given environment map; technology for planning a route of the indoor moving robot through the given environment map; technology for estimating simultaneous positions and generating the map of the indoor moving robot; technology for planning the route of the indoor moving robot; and other technologies as well.

In addition, there is no difference in accuracy compared to a full-range search method of map feature points for estimating the posture including positions and angles of a moving object. However, since the amount of calculation is limited to the number of map feature points within an operation range of an environment sensor on the basis of a current position regardless of the size of a map, there is an effect of greatly contributing to the development of the autonomous driving field of real-time indoor moving objects, where the amount of the calculation should always be limited.

In addition, the present disclosure has an effect of resolving the difficulty in using the feature-based map in real time due to the high amount of calculation, and an effect of resolving the disadvantage of the grid map-based map method that requires high memory.

BRIEF DESCRIPTION OF THE DRAWINGS

FIG. 7 is a flowchart in which a step of estimating the posture is added to FIG. 2.

DESCRIPTION OF THE REFERENCE NUMERALS IN THE DRAWINGS

Figure 1:
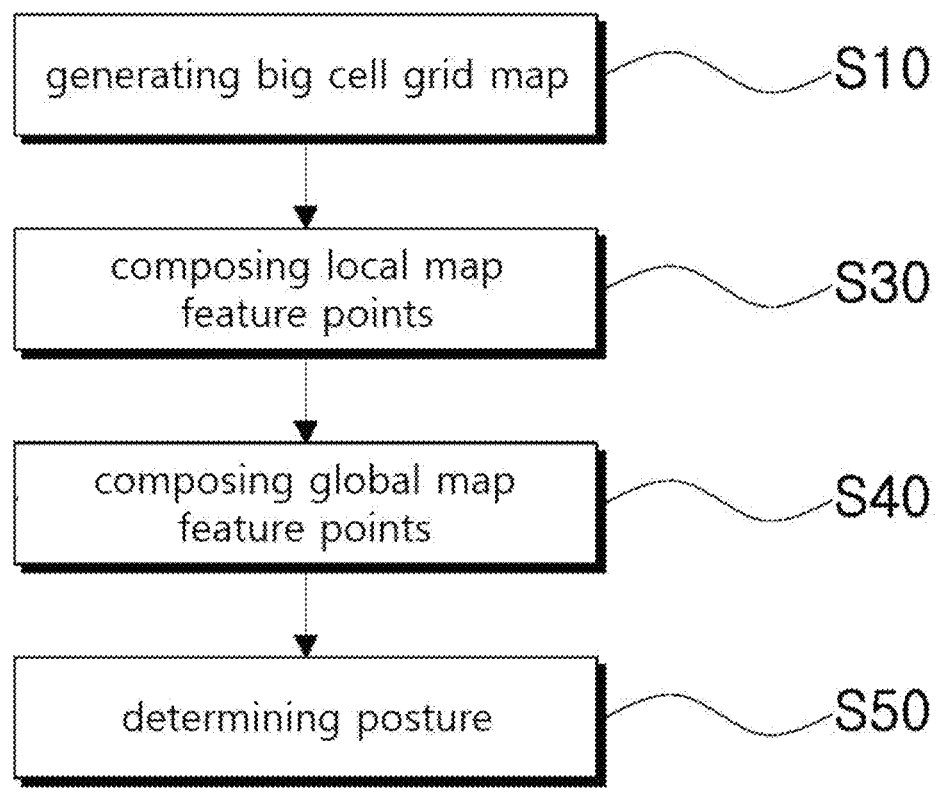
FIG. 1 is a flowchart illustrating a method for estimating the posture of a moving object by using a big cell grid map according to the exemplary embodiment of the present disclosure.

S10: generating big cell grid map
S11: dividing into cells  S12: storing cells

S20: estimating posture
S30: composing local map feature points
S40: composing global map feature points
S50: determining posture

DETAILED DESCRIPTION OF THE DISCLOSURE

In the present disclosure, various modifications may be made and various exemplary embodiments may be provided, and specific exemplary embodiments will be illustrated in the drawings and described in detail. However, this is not intended to limit the present disclosure to a particular disclosed form. On the contrary, the present disclosure is to be understood to include all various alternatives, equivalents, and substitutes that may be included within the spirit and technical scope of the present disclosure.

When a component is described as being "connected", "coupled", or "linked" to another component, that component may be directly connected, coupled, or linked to that other component. However, it should be understood that yet another component between each of the components may be present.

In contrast, when a component is described as being "directly connected", "directly coupled", or "directly linked" to another component, it should be understood that there are no intervening components present therebetween.

The terminology used herein is for the purpose of describing particular exemplary embodiments only and is not intended to be limiting of the present disclosure. As used herein, the singular forms are intended to include the plural forms as well, unless the context clearly indicates otherwise. It will be further understood that the terms "comprise", "include", "have", etc. when used in the present disclosure, specify the presence of features, integers, processes, operations, elements, components, and/or combinations of them stated in the specification, but do not preclude the possibility of the presence or addition of one or more other features, integers, processes, operations, elements, components, and/or combinations thereof.

Unless otherwise defined, all terms including technical and scientific terms used herein have the same meaning as commonly understood by those skilled in the art to which the present disclosure belongs. It will be further understood that terms, such as those defined in commonly used dictionaries, should be interpreted as having a meaning that is consistent with their meaning in the context of the corresponding art and the present disclosure, and will not be interpreted in an idealized or overly formal sense unless expressly so defined herein.

Hereinafter, the present disclosure will be described in more detail with reference to the accompanying drawings. Prior to this, the terms or words used in the present disclosure and claims are not to be construed as being limited to their ordinary or dictionary meanings, and should be interpreted as meanings and concepts corresponding to the technical spirit of the present disclosure based on the principle that inventors may properly define the concept of a term in order to best describe their disclosure. In addition, unless otherwise defined, technical terms and scientific terms used herein have the meanings commonly understood by those skilled in the art to which this disclosure belongs, and in the following description and accompanying drawings, a description of known functions and configurations that may unnecessarily obscure the subject matter of the present disclosure will be omitted. The drawings introduced below are provided as examples in order to sufficiently convey the spirit of the present disclosure to those skilled in the art. Accordingly, the present disclosure is not limited to the drawings presented below and may be embodied in other forms. In addition, the same reference numbers throughout the specification indicate the same elements. It should be noted that the same elements in the drawings are indicated by the same reference numerals wherever possible.

Figure 2:
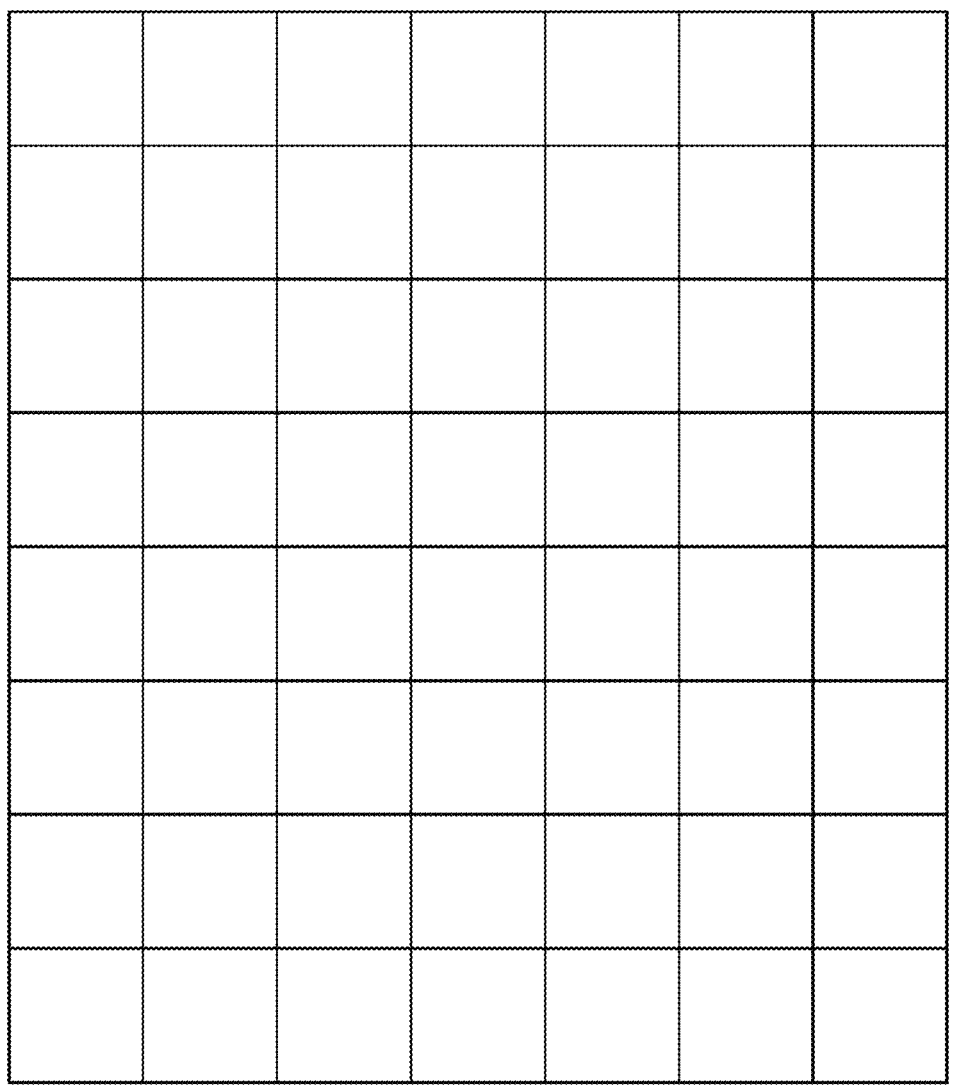
FIG. 2 is an exemplary diagram in which an entire map area is divided into a plurality of finite cells.
Figure 3:
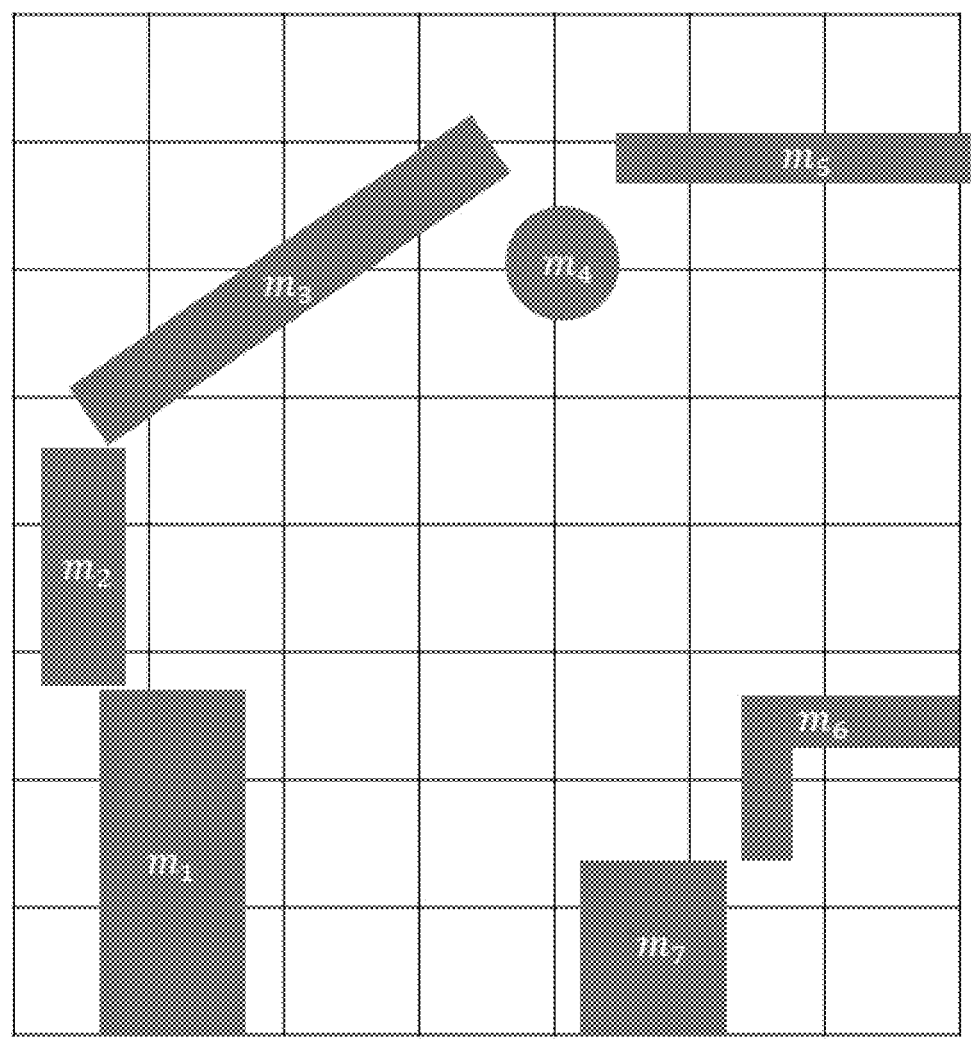
FIG. 3 is an exemplary view illustrating the big cell grid map in which map feature point information corresponding to a position of a corresponding cell is matched for each cell.
Figure 4:
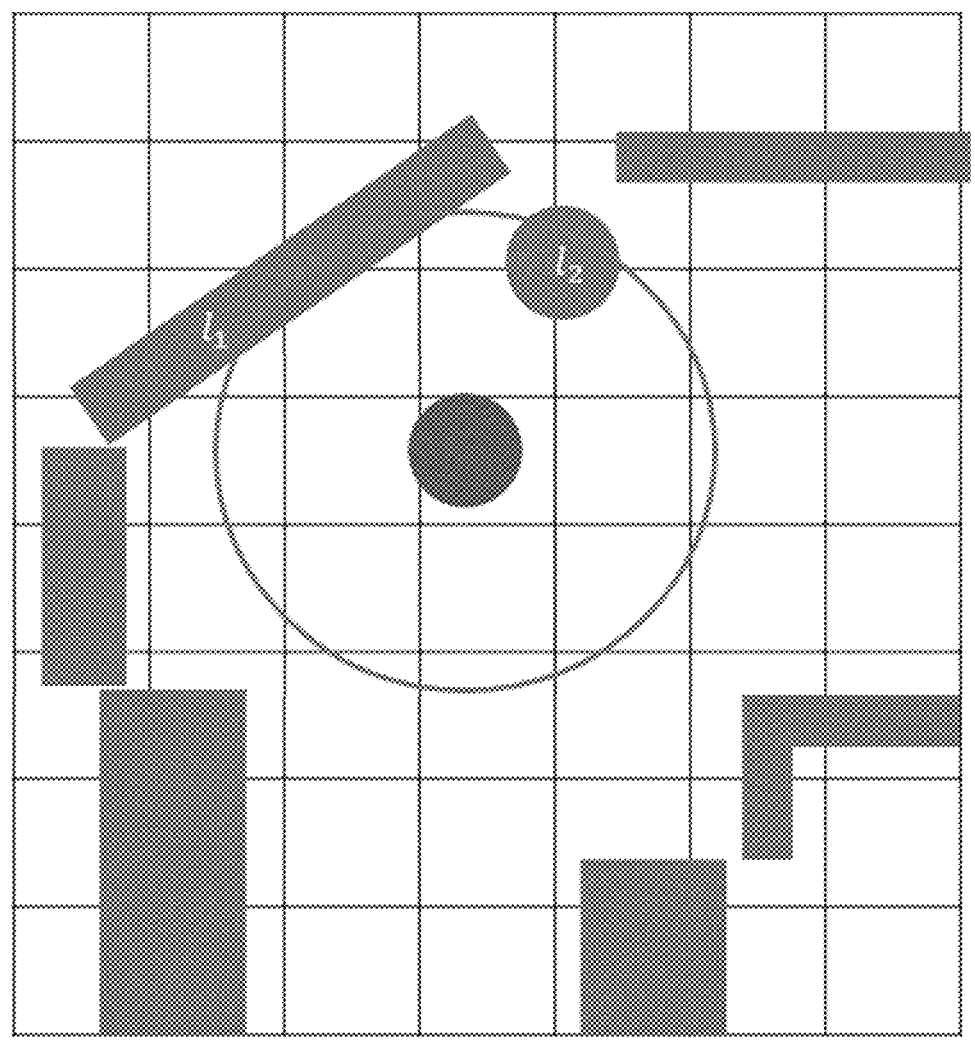
FIG. 4 is an exemplary view in which the moving object is positioned at an arbitrary position in FIG. 3, and a detection area of an environment sensor is indicated by a dotted line.
Figure 5:
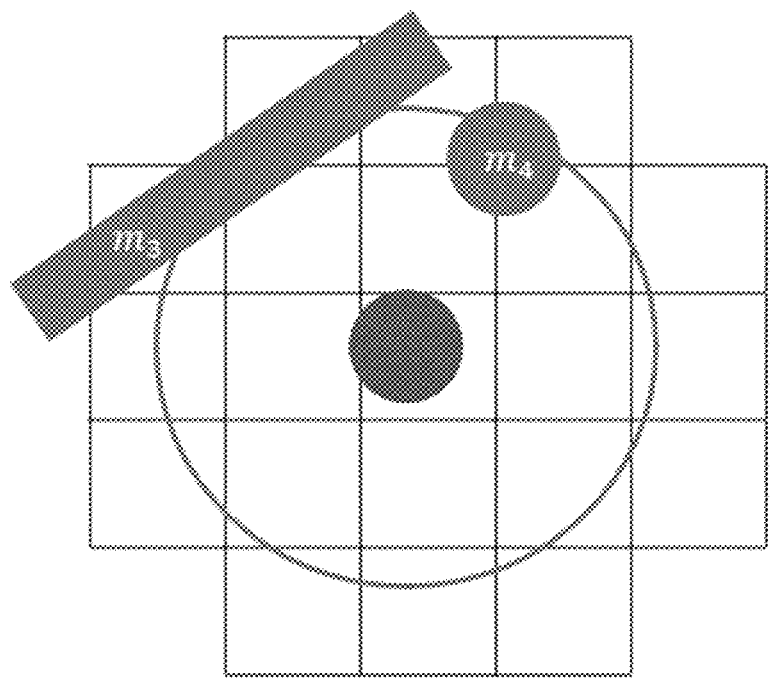
FIG. 5 is an exemplary view illustrating an area composed of cells selected in a step of composing global map feature points of the method for estimating the posture of the moving object by using the big cell grid map.
Figure 6:
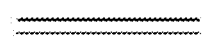
FIG. 6 is a detailed flowchart of a step of generating the big cell grid map of FIG. 1.
Figure 6:

FIG. 1 is a flowchart illustrating a method for estimating the posture of a moving object by using a big cell grid map according to the exemplary embodiment of the present disclosure. FIG. 2 is an exemplary diagram in which an entire map area is divided into a plurality of finite cells. FIG. 3 is an exemplary view illustrating the big cell grid map in which map feature point information corresponding to a position of a corresponding cell is matched for each cell. FIG. 4 is an exemplary view in which the moving object is positioned at an arbitrary position in FIG. 3, and a detection area of an environment sensor is indicated by a dotted line. FIG. 5 is an exemplary view illustrating an area composed of cells selected in a step of composing global map feature points of the method for estimating the posture of the moving object by using the big cell grid map. FIG. 6 is a detailed flowchart of a step of generating the big cell grid map of FIG. 1. In addition, FIG. 7 is a flowchart in which a step of estimating the posture is added to FIG. 2.

Prior to the description, terms used in the present specification (and claims) will be briefly described.

The "moving object" means a movable object, and may be a terminal that may be carried by a person, a means of movement capable of manual or automatic (autonomous) driving, a movable robot, etc.

Here, "robot" refers to a machine that automatically processes or performs a given task by its own ability.

In the method for estimating the posture of the moving object by using the big cell grid map according to the exemplary embodiment of the present disclosure, a new map fusion technique called the big cell grid map has been developed as a means for taking each advantage of grid map and feature map and complementing each other's disadvantage, in order to overcome the limitations of the grid map and the feature map.

The key to the big cell grid map is to enable map feature points stored in a feature map to be accessible on the basis of position information such as the case of the grid map. Since an area may be divided relatively widely, the area does not require a lot of memory so an activity area is not limited by the memory.

That is, the level at which a moving object recognizes an environment does not vary depending on the size of the memory as in the case of a general grid map.

In this case, in the activity area of the moving object, a drivable distance of the moving object acts as a bigger constraint on the limitation of the activity area rather than the memory.

In addition, when the method for estimating the posture of the moving object by using the big cell grid map according to the exemplary embodiment of the present disclosure is applied, no matter how wide a map is generated or utilized, each map feature point may be quickly accessed on the basis of area (i.e., spatial) information, and thus the real-time operation of calculation may be ensured.

In addition, the method for estimating the posture of the moving object by using the big cell grid map according to the exemplary embodiment of the present disclosure may be used for various applications, including: a technique for simultaneous self-position estimation and map preparation; a method for planning a route; or a method for estimating self-position.

As shown in FIG. 1, in the method for estimating the posture of the moving object by using the big cell grid map in the form of a program executed by a calculation processing means including a computer, the method for estimating the posture of the moving object by using the big cell grid map according to the exemplary embodiment of the present disclosure includes: a step S10 of generating a big cell grid map; a step S30 of composing local map feature points; a step S40 of composing global map feature points; and a step S50 of determining posture.

The calculation processing means may be provided in the moving body, so as to enable autonomous driving, and may be provided separately from the moving body, so as to enable the autonomous driving, remote control, or manual control.

In the step S10 of generating a big cell grid map, the calculation processing means divides the entire map area into a plurality of finite cells, and generates the big cell grid map in which map feature point information about a map feature point corresponding to a position of a corresponding cell is matched for each cell.

Referring to FIGS. 2 and 3 as an example, when the entire map area is an area inside an outermost border of FIG. 2, the entire map area of FIG. 2 is divided into the plurality of finite cells. In addition, as shown in FIG. 3, a big cell grid map may be generated by storing information such that map feature point information corresponding to the position of the corresponding cell is matched for each cell.

The plurality of cells is randomly accessible on the basis of the position information such as the case of the grid map.

The map feature point information, which is information on the map feature point, may be characterized in that information satisfying a specific condition is selected from information detected by the moving object with an environment sensor.

Here, the environment sensor means a sensor that detects a surrounding environment (i.e., static obstacles, dynamic obstacles, etc.), and has a different function from a sensor for obtaining driving information, which will be described later.

In this case, the map feature point information is data obtained by a moving object observing a specific object or wall through the environment sensor, or information obtained by processing the data.

Here, the map feature point information may be characterized in that information on a map feature point is processed and then only necessary information is compressed and stored.

That is, map feature point information corresponding to a position of a corresponding cell is matched for each cell, and when a cell is selected, the map feature point information corresponding to the position of the corresponding cell may be checked.

In addition, conversely, the corresponding cell including the map feature point information may be found by using the map feature point information.

The size of the plurality of finite cells may be adjustable in consideration of the size of the entire map area and the calculation performance of the moving object.

That is, each piece of map feature point information is stored in each cell belonging to the big cell grid map.

In this case, each cell may be allocated a respective storage space, and the map feature point information corresponding to the position of the corresponding cell may be stored in the corresponding storage space.

In the estimating of the posture of the moving object, the step S10 of generating the big cell grid map may be omitted after generating the big cell grid map once.

In the step S30 of composing the local map feature points, the calculation processing means extracts map feature point information on the basis of sensing information detected by the moving object with the environment sensor (refer to FIG. 4).

In this case, information on a distance between the moving object and the map feature point may be included as well as the map feature point information of the step S30 of composing the local map feature points.

The extracting of the map feature point information by the calculation processing means is to select the cells required in the step S40 of composing the global map feature points and determine (and correct) the position and posture of the moving object in the step S50 of determining the posture to be described later by performing comparison of the cells selected in the step S40 of composing the global map feature points.

The important thing here is that the values measured by the environment sensor are not converted into the grid map, but abstract feature points are used as they are.

In the step S30 of composing the local map feature points, the sensing information detected by the environment sensor is converted into a global coordinate system, and then map feature point information may be extracted.

In the step S40 of composing the global map feature points, the calculation processing means selects cells included in a detection area of a moving object on the basis of the sensing information of the step S30 of composing the local map feature points. (refer to FIG. 5).

In this case, in the selecting of the cells included in the detection area of the moving object, it is possible to select some cells within a maximal detection radius of the moving object on the basis of the position of the moving object, it is also possible to select all cells at least partially included in the detection area of the moving object on the basis of the position of the moving object, and it is also possible to include the detection area of the moving object and some of the area outside the detection area on the basis of the position of the moving object.

That is, the step S40 of composing the global map feature points is possible to be performed by setting the number of cells to be selected within an allowable range in consideration of the calculation performance of the moving object.

Here, position estimation of a moving object may use various methods, such as estimating a position on the basis of a distance between three or more map feature points and the moving object, or estimating the position on the basis of distance information and direction information. The distance from the moving object and the direction from the moving object may be obtained from the sensing information of the step S30 of composing the local map feature points.

That is, in the step S40 of composing the global map feature points, the cells included in the detection area of the environment sensor of the moving object are selected from the big cell grid map generated in the step S10 of generating the big cell grid map on the basis of the position of the moving object.

In the step S50 of determining the posture, the calculation processing means determines the position and posture of the moving object on the basis of (i.e., in comparison between) the map feature point information of the cells selected in the step S40 of composing the global map feature points and the sensing information detected in the step S30 of composing the local map feature points.

That is, the calculation processing means determines the position and posture of the moving object by comparing the map feature point information of the cells selected in the step S40 of composing the global map feature points and the sensing information detected in the step S30 of composing the local map feature points.

In the method for estimating the posture of the moving object by using the big cell grid map according to the exemplary embodiment of the present disclosure, the method including the step S10 of generating the big cell grid map, the step S30 of composing the local map feature points, the step S40 of composing the global map feature points, and the step S50 of determining the posture, the big cell grid map is used even when the moving object does not recognize a current position thereof, that is, even in the state where the position of the moving object is initialized, so that the moving object may estimate the current position thereof faster and more accurately than the estimation of the grid map or the feature map.

The method for estimating the posture of the moving object by using the big cell grid map according to the exemplary embodiment of the present disclosure may be applicable to various fields, including: technology for estimating and correcting posture of an indoor moving robot in a given environment map; technology for planning a route of the indoor moving robot through the given environment map; technology for estimating simultaneous positions and generating a map of the indoor moving robot; technology for planning the route of the indoor moving robot; and other technologies as well.

In the method for estimating the posture of the moving object by using the big cell grid map according to the exemplary embodiment of the present disclosure, it is characterized in that the map feature point information of the step S10 of generating the big cell grid map is any one piece or a plurality of pieces of information selected from among the information in which a shape of an object detected by the moving object with the environment sensor is expressed in the form of a geometric function, and the position information of a moving point and an identifier for position recognition, which are arbitrarily registered in a map in advance.

Examples of the map feature points may correspond to various figures (i.e., corners, line segments, circles, arcs, and the like) of the environment extracted from environment sensor information and, more abstractly, may correspond to the moving point registered arbitrarily in advance on the entire map.

In this case, it may be characterized in that the identifier for the position recognition is a physical identifier.

Here, the physical identifier may be in the form of a barcode (i.e., one-dimensional barcode, two-dimensional barcode, three-dimensional barcode, and the like) such as QR code, and may be a specific figure, or an RFID chip.

The map feature point information may include information obtained by processing information in which the shape of an object detected by the moving object with the environment sensor is expressed in the form of a geometric function.

In this case, the map feature point information may include not only processed information but also unprocessed information.

Alternatively, the map feature point information may include the moving point arbitrarily registered in advance in the entire map.

Alternatively, the map feature point information may include identifier information for position recognition and position information of the identifier.

As shown in FIG. 6, the step S10 of generating the big cell grid map of the method for estimating the posture of the moving object by using the big cell grid map according to the exemplary embodiment of the present disclosure may include: a step S11 of dividing into cells; and a step S12 of storing the cells.

In the step S11 of dividing into the cells, the entire map area is divided into a finite number of cells, and unique identification information is given to each cell.

In the step S11 of dividing into the cells, the entire map area is divided into a plurality of cells.

For example, in the step S11 of dividing into the cells, the entire map area may be divided in a grid shape.

The grid represents a structure that is repeatedly arranged according to the rules of symmetry. For example, the grid may be the structure in which shapes such as a rectangle, a triangle, a hexagon, and the like are repeatedly arranged.

In the above-described step S11 of dividing into the cells, an example of dividing the entire map area in a grid form is provided, but the present disclosure is not limited thereto, and a form in which various types of figures are assembled is also applicable. That is, even when the shape and size of each cell are not the same, the step S11 may be performed as long as the cells are able to be adjacent to each other.

In the step S11 of dividing into the cells, each piece of unique identification information is given to each cell divided in the step S11.

The provision of the unique identification information to each cell in the step S11 of dividing into the cells is to manage which information is stored in which cell because the piece of information stored in each cell may be different from each other.

In the step S12 of storing the cells, the map feature point information corresponding to the position of the corresponding cell is stored for each cell divided in the step S11 of dividing into the cells.

That is, in the step S12 of storing the cells, the map feature point information corresponding to the position of the corresponding cell is stored with reference to the unique identification information of each cell divided in the step S11 of dividing into the cells.

The storing of the map feature point information in each cell means that map feature point information is stored so that when a cell is selected, the map feature point information stored in the cell is retrieved.

For example, the map feature point information may be stored as one set together with the unique identification information of the corresponding cell. That is, it is possible to store map feature point information in a cell without being allocated a separate storage space (i.e., memory).

As shown in FIG. 7, between the step S10 of generating the big cell grid map and the step S30 of composing the local map feature points, the method for estimating the posture of the moving object by using the big cell grid map according to the exemplary embodiment of the present disclosure may include a step S20 of estimating the posture, wherein a position and posture of a moving object is estimated on the basis of driving information of the moving object by a calculation processing means.

In this case, in the step S40 of composing the global map feature points, it is also possible to select cells included in the detection area of the moving object on the basis of positions estimated in the step S20 of estimating the posture.

That is, in the step S40 of composing the global map feature points, the cells included in the detection area of the moving object may be selected on the basis of the positions estimated in the step S20 of estimating the posture, or the sensing information obtained from the step S30 of composing the local map feature points.

In addition, in the step S50 of determining the posture, on the basis of the map feature point information of the cells selected in the step S40 of composing the global map feature points and the sensing information detected in the step S30 of composing the local map feature points, a final position and posture of the moving object may be determined by correcting the position and posture of the moving object estimated in the step S20 of estimating the posture.

That is, after first estimating the position and posture of the moving object by using a physically moved distance, the position and posture of the moving object may be estimated and corrected secondarily by using data of the global map feature point set.

In addition, a movement controller of the moving object may control movement of the moving object on the basis of the secondarily estimated current position and posture of the moving object.

In this case, in the step S40 of composing the global map feature points, it is also possible to select cells included in the detection area of the moving object on the basis of the position and posture estimated in the step S20 of estimating the posture.

In addition, naturally, in the step S40 of composing the global map feature points, the cells included in the detection area of the moving object may be selected on the basis of the position estimated in the step S20 of estimating the posture, and the sensing information obtained from the step S30 of composing the local map feature points.

The calculation processing means is capable of estimating the position and posture of the moving object on the basis of the driving information of the moving object and the position and posture immediately before the moving object moves.

In this case, the driving information of the moving object may be information such as directions, gravity, speed, acceleration, movement distances, rotation angular velocity of a wheel, and rotation angular acceleration of the wheel, which are generated according to the movement of the moving object.

In the method for estimating the posture of the moving object by using the big cell grid map according to the exemplary embodiment of the present disclosure, the method including the step S10 of generating the big cell grid map, the step S20 of estimating the posture, the step S30 of composing the local map feature points, the step S40 of composing the global map feature points, and the step S50 of determining the posture, it is assumed that a moving object recognizes roughly a position thereof just before moving. By using the big cell grid map, it is possible for the moving object to accurately estimate the position thereof with less amount of calculation while moving than that of the grid map or the feature map.

In the method for estimating the posture of the moving object by using the big cell grid map according to the exemplary embodiment of the present disclosure, the posture of the step S20 of estimating the posture is characterized to include information on a bow angle.

The bow angle information refers to an angle at which the front of a moving object is directed.

That is, when the bow angle information is known, the posture of the moving object may be checked when the moving object is on a flat ground.

In other words, it is possible to check the posture of the moving object only with the bow angle information, and in a case of being used indoors, when the posture of the moving object may be checked only with the bow angle information, the number of sensors required to check the posture of the moving object may be minimized.

In the method for estimating the posture of the moving object by using the big cell grid map according to the exemplary embodiment of the present disclosure, the step S20 of estimating the posture may be characterized in that posture of a moving object is estimated on the basis of a movement distance measured through odometry (i.e., dead reckoning navigation).

On the basis of the movement distance measured or calculated through the odometry (i.e., dead reckoning navigation), the calculation processing means may estimate posture of the moving object only with the posture before the moving object moves, and through a sensor capable of checking the state of the moving object, or an input value (of an Inertial Measurement Unit (IMU) or a motor encoder).

In the method for estimating the posture of the moving object by using the big cell grid map according to the exemplary embodiment of the present disclosure, the step S30 of composing the local map feature points is characterized in that a local map feature point set z composed of the extracted map feature point information is generated.

The map feature point information extracted in the step S30 of composing the local map feature points may be referred to as local map feature point information, and the pieces of local map feature point information may be called a local map feature point set L.

That is, the local map feature point set L is composed of the map feature points of objects detected by the current moving object with the environment sensor.

$$L=\{I_1,I_2,I_3,\ldots,I_N\}$$

In the above equation, N is the number of currently measured local map feature points.

In the above equation, $I_i$ denotes the observed i-th map feature point.

The composing of the local map feature point set is to estimate a self-position of a moving object by performing the comparison with the map feature points in the memory of the moving object.

In the method for estimating the posture of the moving object by using the big cell grid map according to the exemplary embodiment of the present disclosure, the step S40 of composing the global map feature points is characterized in that a global map feature point set $M_r$ composed of the pieces of map feature point information belonging to respective cells included in the detection area of the moving object is generated.

$$M_r=\{m_k|mhd\ k\in M\ \text{and}\ k\in C_r\}$$

In the above equation, $C_r$ represents an index set of map feature points belonging to the respective cells included in the detection area of the moving object, and $m_k$ represents the k-th map feature point recorded in the map feature point set M in the entire map. The map feature point set M may be expressed as follows.

$$M=\{m_1,m_2,m_3,\ldots,m_k\}$$

In the above equation, K means the number of all map feature points.

The embodiment of the present disclosure is characterized in that the global map feature point set is used so that without considering all map feature points in the map, only map feature points with a high probability of being discovered by the moving object are extracted and used to estimate the posture of the moving object, whereby the amount of calculation may be reduced.

When the reliability of the first estimated position of the moving object is low, the number of cells selected in the step S40 of composing the global map feature points may be extended beyond the detection area.

That is, by using the big cell grid map, the global map feature point set may be composed with the map feature points belonging to an area detectable by the environment sensor on the basis of the position of the moving object.

The map feature points composed in the step S40 of composing the global map feature points may be used to estimate the posture of the moving object.

In addition, in the method for estimating the posture of the moving object by using the big cell grid map according to the exemplary embodiment of the present disclosure, the step S50 of determining the posture is characterized in that the posture of the moving object estimated in the step S20 of estimating the posture is corrected by comparing the local map feature point set L and the global map feature point set $M_r$.

After the step S50 of determining the posture, when the calculation processing means recognizes that changes (i.e., movement, addition, or deletion) have occurred in the big cell grid map generated in the step S10 of generating the big cell grid map and in the map feature point information extracted from the step S30 of composing the local map feature points, the method for estimating the posture of the moving object by using the big cell grid map according to the exemplary embodiment of the present disclosure is characterized to include a step of updating a map (not shown), wherein the big cell grid map is updated.

The reason is that even when arrangement of static obstacles such as some furniture is changed, the big cell grid map is allowed to be automatically updated, so as to be usable without a separate update.

In this case, the step S10 of generating the big cell grid map is characterized in that among the map feature point information stored in the big cell grid map, information on fixed and static obstacles related to structures such as exterior walls of buildings and information on movable and static obstacles such as furniture are distinguished from each other and then stored.

That is, the calculation processing means prioritizes map feature point information for the fixed and static obstacles to determine the position and posture of the moving object, and when a change in the map feature point information for the movable and static obstacles is detected, the calculation processing means may update the big cell grid map by reflecting the change.

Hereinafter, the exemplary embodiment using the method for estimating the posture of the moving object by using the big cell grid map according to the exemplary embodiment of the present disclosure will be described.

It is assumed that before moving, a moving object 100 stores a big cell grid map including the map feature points as in FIG. 3.

As shown in FIG. 4, in the step S20, when the moving object 100 moves from an arbitrary position, a position and posture of the moving object 100 may be estimated after receiving a movement distance and bow angle data from an inertial sensor and the odometry of the moving object 100.

In addition, in the step S30, an environment sensor of the moving object 100 detects an environment of a detection area 101 of the environment sensor, so that as shown in FIG. 5, map feature points $I_1$ and $I_2$ that may be obtained from objects measured in the environment are extracted, thereby composing a local map feature point set.

Thereafter, in the step S40, a global map feature point set is composed by extracting map feature points belonging to as many cells (refer to FIG. 5) as the detection areas 101 of the environment sensor of the moving object 100.

Thereafter, in the step S50, the initially estimated position and posture of the moving object 100 are corrected by comparing the local map feature point set and the global map feature point set.

The finally corrected position and posture information of the moving object 100 is transmitted to the movement controller of the moving object.

In such processes, when the big cell grid map is not used, it takes more time because the local map feature point set and all map feature points on the map have to be compared to each other.

The method for estimating the posture of the moving object by using the big cell grid map according to the exemplary embodiment of the present disclosure has been described above. However, naturally, a computer-readable recording medium in which a program for implementing the method for estimating the posture of the moving object by using the big cell grid map is stored, and a program stored in the computer-readable recording medium for implementing the method for estimating the posture of the moving object by using the big cell grid map are also able to be implemented.

That is, those skilled in the art may readily understand that in the method for estimating the posture of the moving object by using the big cell grid map as described above, the program of instructions for implementing the above method is categorically implemented, so that the implemented program may be included and provided in the computer-readable recording medium through a computer. In other words, the method may be implemented in the form of program instructions that may be executed through various computer means, and may be recorded in the computer-readable recording medium. The computer-readable recording medium may include: program instructions, data files, data structures, and the like individually or in combination. The program instructions recorded on the computer-readable recording medium may be specially designed and configured for the embodiment of the present disclosure, or may be known and available to those skilled in the art of computer software. Examples of the computer-readable recording media include: magnetic media such as hard disks, floppy disks, and magnetic tapes; optical media such as CD-ROMs and DVDs; magneto-optical media such as floptical disks; and a hardware device specially configured to store and execute program instructions, the hardware device including such as ROM, RAM, flash memory, USB memory, etc. Examples of program instructions include not only machine language codes such as those generated by a compiler, but also high-level language codes that may be executed by a computer using an interpreter or the like. The hardware device described above may be configured to operate by one or more software modules to perform the operation of the embodiment of the present disclosure, and vice versa.

The present disclosure is not limited to the above-described exemplary embodiments, and apparently, the scope of application is diverse. In addition, various modifications can be made without departing from the spirit of the present disclosure as claimed in the claims.

What is claimed is:

1. A method for estimating a posture of a moving object by using a big cell grid map implemented in a form of a program executed by a calculation processing means including a computer, the method comprising:

a step (S10) of generating the big cell grid map, wherein the calculation processing means divides a map into a plurality of cells, and generates the big cell grid map in which map feature point information about a map feature point corresponding to a position of a corresponding cell is matched for each cell;

a step (S30) of composing local map feature points, wherein the calculation processing means extracts the map feature point information and a distance information between the moving body and the map feature point based on a sensing information detected by an environment sensor of the moving object;

a step (S40) of composing global map feature points, wherein the calculation processing means selects cells included in a detection area of the moving object based on the sensing information of obtained in the step (S30), and extracts the map feature point information belonging to the selected cells; and a step (S50) of determining the posture, wherein the calculation processing means determines a position and the posture of the moving object based on the extracted map feature point information of the cells selected in the step (S40) and the sensing information detected in the step (S30), wherein the step (S10) of generating the big cell grid map comprises:

a step (S11) of dividing the map, wherein an entire area of the map is divided into the plurality of cells and a unique identification information is provided to each of the plurality of cells; and a step (S12) of storing the map feature point information corresponding to the position of the corresponding cell on each of the plurality of cells referring to the unique identification information, wherein the plurality of cells are randomly accessed based on a location information of each of the plurality of cells, and wherein the extracted map feature point information of the cells selected in the step (S40) includes an information satisfying a specific condition selected from information detected by the environment sensor.

2. The method of claim 1, wherein the map feature point information in the step (S10) is any one piece or a plurality of pieces of information selected from among information in which a shape of an object detected by the moving object with the environment sensor is expressed in a form of a geometric function and position information of a moving point and an identifier for position recognition that are arbitrarily registered in the map in advance.

3. The method of claim 1, wherein, between the step (S10) of generating the big cell grid map and the step (S30) of composing the local map feature points, the method for estimating the posture of the moving object by using the big cell grid map comprises:

a step (S20) of estimating the posture, wherein the calculation processing means estimates the position and the posture of the moving object based on a driving information of the moving object.

4. The method of claim 1, wherein the posture of the moving body comprises bow angle information.

5. The method of claim 1, wherein the step (S20) estimates the posture of the moving object based on a movement distance measured through odometry (i.e., dead reckoning navigation).

6. The method of claim 1, wherein the step (S30) of composing the local map feature points generates a local map feature point set composed of extracted pieces of the map feature point information.

7. The method of claim 1, wherein the step (S40) of composing the global map feature points composes a global map feature point set composed of pieces of the map feature point information belonging to the respective cells included in the detection area of the moving object, and the step (S50) of determining the posture corrects the posture of the moving object estimated in the step (S20) of estimating the posture by comparing the local map feature point set and the global map feature point set.

8. The method of claim 1, wherein the map feature point information includes data obtained by observing a specific object or wall through the environment sensor.

9. The method of claim 8, wherein the data obtained by the environment sensor is processed, and then only necessary information is compressed, and stored.

10. The method of claim 1, wherein the map feature point information corresponding to the position of the corresponding cell is matched for each of the plurality of cells, and when a cell of the plurality of cells is selected, the map feature point information corresponding to the position of the corresponding cell is confirmed.

11. The method of claim 1, wherein the local map feature point is obtained by converting the sensing information detected from the environment sensor into a global coordinate system, and extracting the map feature point information from the global coordinate system.

12. A non-transitory computer-readable recording medium
storing a program for enabling a computer to execute the method of claim 1.

* * * * *